United States Patent
Lee et al.

(10) Patent No.: US 12,533,033 B2
(45) Date of Patent: Jan. 27, 2026

(54) METHOD FOR INVESTIGATING OPTICAL ELEMENT EMBEDDED IN INTRAORAL SCANNER, AND SYSTEM USING SAME

(71) Applicant: MEDIT CORP., Seoul (KR)

(72) Inventors: Soo Bok Lee, Seoul (KR); Sung Bin Im, Seoul (KR)

(73) Assignee: Medit Corp., Seoul (KR)

( * ) Notice: Subject to any disclaimer, the term of this patent is extended or adjusted under 35 U.S.C. 154(b) by 520 days.

(21) Appl. No.: 17/848,699

(22) Filed: Jun. 24, 2022

(65) Prior Publication Data

US 2022/0313094 A1    Oct. 6, 2022

Related U.S. Application Data

(63) Continuation-in-part of application No. PCT/KR2020/019072, filed on Dec. 24, 2020.

(30) Foreign Application Priority Data

Dec. 26, 2019   (KR) .......................... 10-2019-0175290

(51) Int. Cl.
*A61B 5/00*    (2006.01)
*A61B 1/24*    (2006.01)
(Continued)

(52) U.S. Cl.
CPC .............. *A61B 5/0088* (2013.01); *A61B 1/24* (2013.01); *A61C 9/0053* (2013.01); *G01N 21/94* (2013.01);
(Continued)

(58) Field of Classification Search
CPC ....... A61B 5/0088; A61B 1/24; G06T 7/0012; G06T 2207/30036; A61C 9/0053;
(Continued)

(56) References Cited

U.S. PATENT DOCUMENTS

2007/0177136 A1 * 8/2007 Nakano .................. H01L 22/12
                                                    257/E21.53
2010/0053790 A1 * 3/2010 Hayashi ................. G01N 21/95
                                 (Continued)

FOREIGN PATENT DOCUMENTS

JP     2012-147909 A       8/2012
JP     2018107665 A    *  7/2018
                 (Continued)

OTHER PUBLICATIONS

Extended European Search Report mailed Oct. 24, 2023 from the European Patent Office for European Application No. 20907029.1.
(Continued)

*Primary Examiner* — Georgia Y Epps
*Assistant Examiner* — Erin R Garber

(57) ABSTRACT

The present disclosure relates to a method for self-investigating an optical element embedded in an intraoral scanner, and a system using the same. The reliability of an intraoral scanner may decrease due to foreign matter attached to an optical element. Accordingly, the present disclosure provides a prescribed method for investigating foreign matter attached to an optical element, and a system using the same, wherein an alarm providing notification of the need to inspect the optical element is generated when it is determined that foreign matter has stained the optical element. According to said investigation method and system, a user of an intraoral scanner can automatically determine the presence or absence of foreign matter when scanning an object (patient's affected area), and thus can service the optical element or replace a part in which the corresponding component is formed. Therefore, there is an advantage of improving the scanning efficiency and data reliability of the intraoral scanner.

19 Claims, 8 Drawing Sheets

(51) Int. Cl.
*A61C 9/00* (2006.01)
*G01N 21/94* (2006.01)
*G01N 21/958* (2006.01)
*G06T 7/00* (2017.01)
*A61C 19/00* (2006.01)
*A61C 19/04* (2006.01)

(52) U.S. Cl.
CPC ......... *G01N 21/958* (2013.01); *G06T 7/0012* (2013.01); *A61C 19/002* (2013.01); *A61C 19/04* (2013.01); *G06T 2207/30036* (2013.01)

(58) Field of Classification Search
CPC ....... A61C 19/002; A61C 19/04; G01B 11/24; G01B 21/047; G01N 21/94; G01N 21/958; G01N 21/88
See application file for complete search history.

(56) References Cited

U.S. PATENT DOCUMENTS

| | | | |
|---|---|---|---|
| 2015/0330913 A1* | 11/2015 | Heskee, III | G01N 21/8851 356/239.8 |
| 2017/0231718 A1* | 8/2017 | Wohrle | A61C 1/082 433/27 |
| 2018/0144464 A1* | 5/2018 | Ben-Dor | G06T 7/0012 |
| 2019/0287237 A1* | 9/2019 | de Bonfim Gripp | G06T 7/64 |
| 2019/0369031 A1* | 12/2019 | Niikura | G02B 27/0006 |
| 2021/0085238 A1* | 3/2021 | Schnabel | A61C 7/002 |
| 2021/0255086 A1* | 8/2021 | Nakai | G01N 15/1459 |

FOREIGN PATENT DOCUMENTS

| | | | |
|---|---|---|---|
| KR | 10-2014-0077380 A | 7/2014 | |
| KR | 10-1662566 A | 10/2016 | |
| KR | 101662566 B1 * | 10/2016 | ............. A61B 1/24 |
| KR | 10-2017-0111848 A | 11/2017 | |
| KR | 10-1874547 B1 | 7/2018 | |
| KR | 10-2018-0133577 A | 12/2018 | |
| KR | 10-2042024 B1 | 11/2019 | |

OTHER PUBLICATIONS

International Search Report mailed Jun. 9, 2021 for International Application No. PCT/KR2020/019072 and its English translation.
Non-final office action mailed Jun. 14, 2021 for Korean Application No. 10-2019-0175290.
Notice of Allowance mailed Dec. 3, 2021 for Korean Application No. 10-2019-0175290.

* cited by examiner

METHOD FOR INVESTIGATING OPTICAL ELEMENT EMBEDDED IN INTRAORAL SCANNER, AND SYSTEM USING SAME

CROSS-REFERENCE TO RELATED APPLICATIONS

This application is a Continuation-In-Part application of International Application No. PCT/KR2020/019072, filed Dec. 24, 2020, which claims the benefit of Korean Patent Application No. 10-2019-0175290, filed Dec. 26, 2019 in the Korean Intellectual Property Office, the disclosures of which are incorporated herein in their entirety by reference.

TECHNICAL FIELD

The present disclosure relates to a method for investigating an optical element embedded in an intraoral scanner and a system using the same, and to a method for investigating an optical element capable of confirming the reliability of information acquired by being refracted or reflected from the optical element, and a system using the same.

BACKGROUND ART

A three-dimensional scanning technology is a concept that refers to all processes of projecting a laser, white light, or the like to an object using a three-dimensional scanner, and acquiring shape information of the object to convert the shape information into digital information. The shape information obtained from the three-dimensional scanner that performs a three-dimensional scanning is actively used in reverse engineering and quality inspection fields. Data obtained by the three-dimensional scanning may obtain more accurate shape information for an actual object when compared with a model obtained by acquiring impression through an material such as alginate.

Meanwhile, dental CAD/CAM (computer aided design/computer aided manufacturing) technologies are widely used in dental treatment, particularly, prosthetic treatment. The most important thing in the dental treatment using CAD/CAM is to acquire sophisticated three-dimensional data on the shape of the patient's affected area, such as teeth, gums, and jawbone. When using the three-dimensional data of the affected area, prosthetic treatment or orthodontic treatment may be accurately performed by using a computer. When acquiring the three-dimensional data, the use of handheld oral scanners, in which a therapist grips and inserts equipment into the patient's oral cavity to capture the teeth and gums positioned in the oral cavity, and implement the captured teeth and gums as three-dimensional shape data, is gradually spreading.

A part of the intraoral scanner is directly inserted into the patient's oral cavity to capture the affected area (teeth, gums, jawbone, or the like), and in the capturing process, foreign matter such as the patient's saliva may be attached to the intraoral scanner. Foreign matter stained on the intraoral scanner interferes with the acquisition of accurate shape information on the patient's affected area in subsequent capturing, which degrades the reliability of the shape information obtained through the three-dimensional scanning. The three-dimensional shape information with degraded reliability makes it difficult to effectively treat the patient's affected area, which undermines the meaning of using the intraoral scanner.

Foreign matter may be stained on a surface of a reflective member (hereinafter, referred to as an optical element) such as a mirror configuring the intraoral scanner. Accordingly, there is a need for a method for quickly removing foreign matter by detecting the foreign matter attached to the optical element and notifying the therapist that the foreign matter is generated.

SUMMARY OF INVENTION

Technical Problem

An object of the present disclosure is to provide a method for investigating an optical element, which notifies a user of an intraoral scanner, and enables the user to quickly replace relevant parts and maintain an intraoral scanner by detecting foreign matter by a digital investigating method when the foreign matter is stained inside the intraoral scanner, particularly, on a surface of the optical element configured to refract or reflect light, and a system using the same.

Solution to Problem

A method for investigating an optical element embedded in an intraoral scanner according to the present disclosure may include an image recognizing operation of acquiring image data by receiving light reflected from an object in a measurement area of the intraoral scanner, a foreign matter detecting operation of checking whether foreign matter is stained on the optical element from the image data, and a notification generating operation of generating a feedback when it is determined that the foreign matter exists on the optical element as the foreign matter detecting operation is performed.

In addition, the foreign matter detecting operation may include a base operation of generating a count area corresponding to the measurement area.

In addition, the size of the count area may be formed in the same size as that of the capturing area, and pixels of the capturing area may have the one-to-one correspondence with pixels of the count area.

In addition, the foreign matter detecting operation may include a specifying operation of changing values of at least some pixels of the count area corresponding to a portion where an input result does not exist depending on whether the image data is input.

In addition, the count area may be initialized before the specifying operation, and the specifying operation may add the values of the at least some pixels of the count area.

In addition, the foreign matter detecting operation may further include a reallocating operation of initializing the values of at least some pixels of the count area corresponding to a portion where the input result exists depending on whether the image data is input.

In addition, the specifying operation or the reallocating operation may be repeatedly performed for each image data acquired by the image recognizing operation.

In addition, the notification generating operation may be performed when the values of the at least some pixels of the count area are greater than or equal to a first set value.

In addition, the method may include a determination operation of performing the notification generating operation when the number of pixels in which the values of the at least some pixels of the count area are greater than or equal to the first set value is counted and the number of pixels counted is greater than or equal to a second set value.

In addition, a value added by the specifying operation may be 1.

In addition, the notification generating operation may output a notification message that requests the inspection of the optical element on a display device connected to the intraoral scanner or generate a notification sound.

In addition, the method may further include a light irradiation operation of irradiating light of a specific pattern to the object, wherein the image data acquired in the image recognizing operation includes a predetermined pattern.

Meanwhile, a system for investigating an optical element according to the present disclosure may include a case drawn into and drawn out from an oral cavity, and formed with an opening that is open so that a state inside the oral cavity is incident therein in the form of light through one end, at least one imaging unit disposed inside the case, and configured to receive light incident through the opening of the case to acquire image data, a light irradiation unit disposed at one side of the imaging unit, and configured to emit light to irradiate the state inside the oral cavity through the opening, an intraoral scanner including an optical element configured to illuminate an object by refracting or reflecting light generated from the light irradiation unit, and cause light reflected from the object to enter into the at least one imaging unit, and an optical element investigation unit configured to determine whether foreign matter exists on the optical element from the image data acquired from the imaging unit.

In addition, the imaging unit may include an imaging sensor, and the optical element investigation unit may include a determination unit configured to determine whether the foreign matter is stained through a count area corresponding to the imaging sensor.

In addition, the count area may have pixels having the one-to-one correspondence with the image data generated by the imaging sensor, and the determination unit may determine whether the foreign matter is stained through pixel values of the count area that vary depending on whether the image data is input.

In addition, the determination unit may add values of at least some pixels of the count area corresponding to a portion where an input result does not exist depending on whether the image data is input.

In addition, the determination unit may initialize the pixel value of the count area before adding the pixel values of the at least some pixels of the count area.

In addition, the determination unit may initialize values of at least some pixels of the count area corresponding to a portion where the input result exists depending on whether the image data is input.

In addition, the determination unit may add values of at least some pixels of the count area corresponding to a portion where an input result of the image data does not exist or initialize values of at least some pixels of the count area corresponding to a portion where the input result of the image data exists depending on the image data acquired by the imaging sensor.

In addition, the determination unit may generate a feedback when the values of the at least some pixels of the count area are greater than or equal to a first set value.

In addition, the determination unit may generate a feedback when the number of pixels in which the values of the at least some pixels of the count area are greater than or equal to a first set value is counted and the number of pixels counted is greater than or equal to a second set value.

Meanwhile, the intraoral scanner according to the present disclosure configured to scan the object within the oral cavity through the optical element provided therein may include an opening provided on a front end of a case, and through which light is input and output, a mirror provided inside the case adjacent to the opening, and configured to form an optical path between the optical element and the object by refracting or reflecting light, and an investigation unit configured to investigate whether foreign matter is stained on a surface of the mirror.

Advantageous Effects of Invention

According to the method for investigating the optical element embedded in the intraoral scanner according to the present disclosure configured as described above, and the system using the same, it is possible to inspect the state of the optical element of the intraoral scanner used by the user, or replace the tip case on which the optical element is disposed when the user sees a message output on the display device or hears the alarm sound. In addition, the user can perform the scan operation without directly inspecting the state of the optical element from time to time, so that it is possible to improve the operation efficiency of the user, and improve the scan reliability of the intraoral scanner.

In addition, it is possible to prevent the false detection of the foreign matter by performing the capturing a plurality of times in the reallocating operation to return the pixel values of the count area to the initial values eventually for the portion where the measurement result does not exist momentarily.

In addition, it is possible to confirm the presence or absence of the foreign matter by performing the reallocating operation and the specifying operation again, and improve the reliability of the investigating method.

In addition, it is possible to improve the accuracy of the detection for the presence or absence of the foreign matter when the alarm generating operation is performed only when both the first set value and the second set value are satisfied.

DESCRIPTION OF EMBODIMENTS

Figure 1:
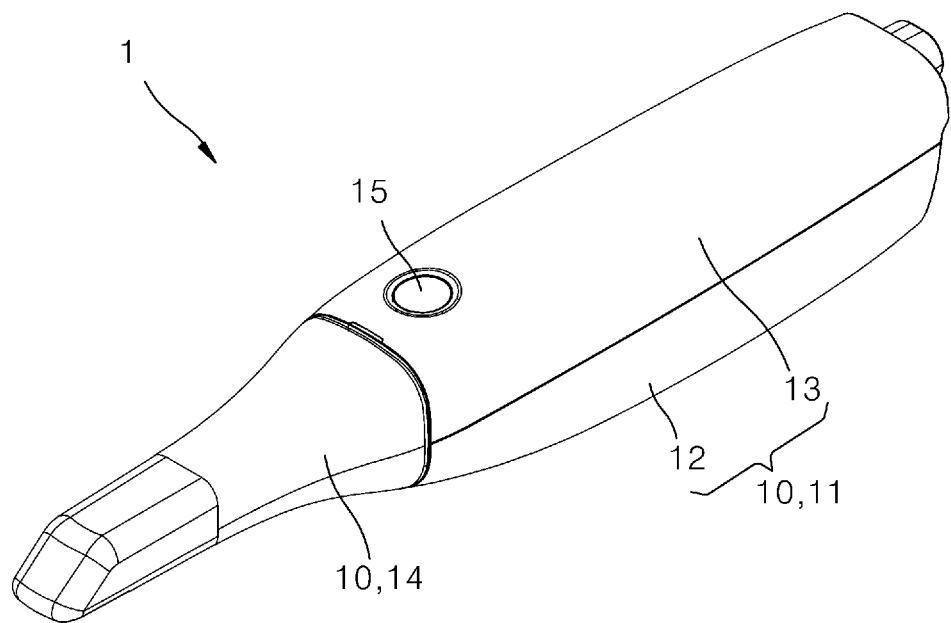
FIG. 1 is a view schematically showing an intraoral scanner to which a method for investigating an optical element embedded in the intraoral scanner according to the present disclosure is applied.

Advantages and features of the present disclosure, and methods for achieving them, will become apparent with reference to the embodiments described below in detail in conjunction with the accompanying drawings. However, the present disclosure is not limited to the embodiments disclosed below, but the advantages and features of the present disclosure to be implemented in various different forms, and a method for achieving them will be apparent with reference to the embodiments described later in detail with the accompanying drawings. However, the present disclosure is not limited to embodiments disclosed below but will be implemented in various different forms, and only these embodiments are provided so that the disclosure of the present disclosure will be thorough and complete and will fully convey the scope of the present disclosure to those skilled in the art to which the present disclosure pertains, and the present disclosure is defined by the description of the claims. Throughout the specification, the same configurations are denoted by the same reference numerals.

Hereinafter, embodiments of the present disclosure will be described in detail with reference to the drawings.

Figure 2:
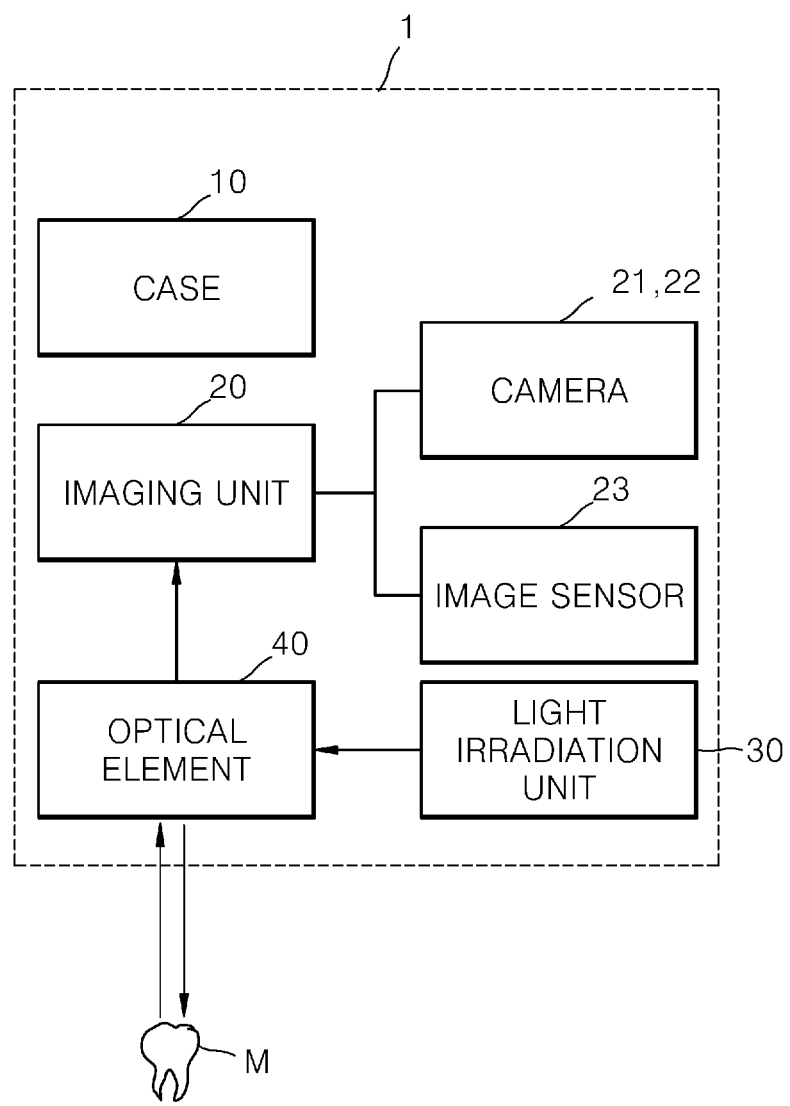
FIG. 2 is a schematic view of the intraoral scanner.
Figure 3A:
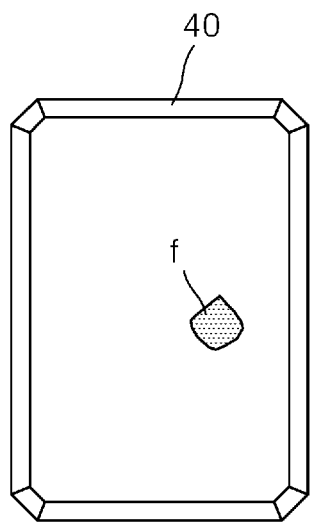
FIG. 3A is a view for describing that foreign matter is stained on the optical element in the intraoral scanner according to the present disclosure.
Figure 3B:
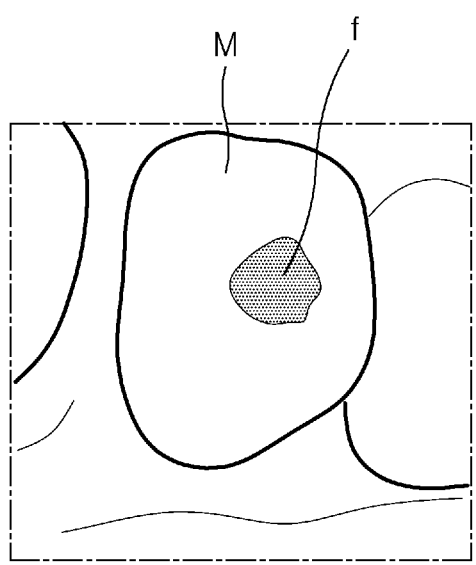
FIG. 3B is a view for describing when capturing is performed in a state in which foreign matter is stained on the optical element in the intraoral scanner according to the present disclosure.
Figure 3C:
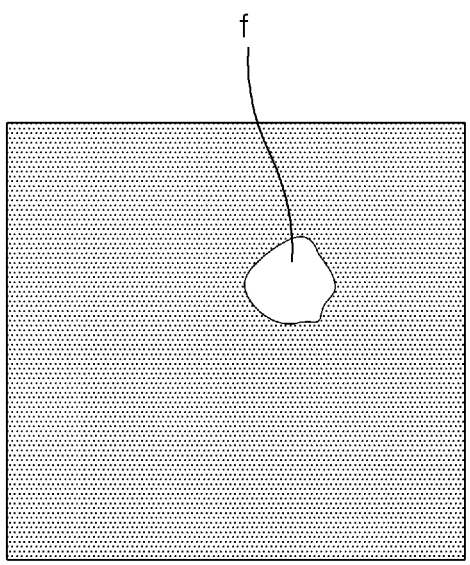
FIG. 3C is a view showing only a shape of the foreign matter in FIG. 3B.

FIG. 1 is a view schematically showing an intraoral scanner 1 to which a method for investigating an optical element embedded in the intraoral scanner according to the present disclosure is applied, and FIG. 2 is a schematic view of the intraoral scanner. In addition, FIG. 3A is a view for describing that foreign matter is stained on the optical element in the intraoral scanner according to the present disclosure, FIG. 3B is a view for describing when capturing is performed in a state in which foreign matter is stained on the optical element in the intraoral scanner according to the present disclosure, and FIG. 3C is a view showing only a shape of the foreign matter in FIG. 3B.

As shown in FIGS. 1 and 2, the intraoral scanner 1 includes a case 10 that may be drawn into and drawn out from an oral cavity, and is formed with an opening that is open so that a state inside the oral cavity is incident in the form of light through one end. The case 10 of the intraoral scanner includes a portion that comes into direct contact with the patient's oral cavity. For example, the case 10 of the intraoral scanner protects internal parts of the intraoral scanner from the external environment. Meanwhile, the case 10 of the intraoral scanner includes a body case 11 gripped by a user (person who performs treatment by scanning the inside of the patient's oral cavity, or the like) and having parts disposed therein, and a tip case 14 formed to be detachable from one end of the body case 11. The tip case 14 may be drawn into and drawn out from the patient's oral cavity so that the inside and outer surface of the oral cavity may come into direct contact therewith.

The body case 11 may include a lower case 12 configuring a lower portion of the intraoral scanner 1, and an upper case 13 configuring an upper portion of the intraoral scanner 1, and parts such as an imaging unit 20 and a light irradiation unit 30 may be disposed between the body case 12 and the upper case 13. An operation of the intraoral scanner 1 using the imaging unit 20 and the light irradiation unit 30 will be described later. Meanwhile, a power supply unit 15 may be formed on one surface of the upper case 13. The power supply unit 15 may be formed in the form of a one-touch button, and the intraoral scanner 1 may be turned ON/OFF with a single click.

The tip case 14 is configured to be separated from the body case 11 and replaced. During normal use, the tip case 14 is maintained through disinfection, and when the tip case 14 is damaged or worn due to long-term use, the tip case 14 may be replaced with a new product and used continuously. Meanwhile, an optical element 40 may be formed inside the tip case 14. Typically, the optical element 40 may illuminate an object by refracting or reflecting light like a lens or a mirror, and receive the reflected light from the object again. Meanwhile, the optical element 40 formed inside the tip case 14 may be a mirror that reflects light through the surface thereof, and the mirror may be formed by being attached to the inside of one end of the tip case 14 in order to well illuminate the inside of the patient's oral cavity and efficiently causes light to enter into the intraoral scanner 1.

The imaging unit 20 configured to receive light incident through an opening formed at one end of the tip case 14 may be formed inside the body case 11 of the intraoral scanner 1. The imaging unit 20 receives light, which is reflected from the object to be captured, refracted and reflected by the optical element 40 formed inside the tip case 14 through the opening. Meanwhile, the imaging unit 20 may further include cameras 21 and 22 configured to receive light, and an imaging sensor 30 connected to the cameras 21 and 22 and provided on an imaging board. When light reflected from the object to be captured is refracted and reflected by the optical element 40 and incident on the cameras 21 and 22, the imaging sensor 30 connected to the cameras 21 and 22 may receive light and generate image data for the received light. The imaging unit 20 may also be formed to have one camera 21 or 22, and the imaging unit 20 may be formed to have two or more cameras 21 and 22, so that the cameras 21 and 22 may be disposed to be spaced apart from each other in a width direction of the body case 11.

The light irradiation unit 30 may be formed inside the body case 10 of the intraoral scanner 1. The light irradiation unit 30 may include a member capable of emitting light by receiving power when the power supply unit 15 is in an ON state. Light generated by the light emitting member may be refracted and reflected by the optical element 40 formed inside the tip case 14 and may pass through the opening formed at one end of the tip case 14 to illuminate the state of the inside of the patient's oral cavity. Conventionally, a lighting used in a dental treatment chair is covered by a main body of the intraoral scanner 1 to form a shadow inside the patient's oral cavity, but it is possible to sufficiently illuminate the inside of the patient's oral cavity, and acquire reliable data by emitting light from the light irradiation unit 30 of the intraoral scanner 1.

As a wavelength of light generated from the light irradiation unit 30, any form of light capable of receiving light from the cameras 21 and 22 of the imaging unit 20 to clearly identify the patient's affected object as image data from the imaging sensor 32 may also be used. For example, light generated by the light irradiation unit 30 may be light in the visible ray region. However, light generated by the light irradiation unit 30 does not necessarily have a wavelength in the visible ray region, and may also be controlled so that light having a wavelength out of the visible ray region is generated, as necessary.

When foreign matter f introduced from the patient's oral cavity through the opening is stained on the optical element 40 formed inside the tip case 14 while the intraoral scanner 1 is used, accurate measurement becomes impossible. Meanwhile, the foreign matter f is interpreted as a different material other than normal in the dictionary meaning, but in this specification, may be interpreted as the meaning that refers to all elements interfering with the scan inside the oral cavity due to the light refraction or reflection of the optical element, including the patient's saliva and cell tissues inside the oral cavity. In other words, the foreign matter may be construed as any material or state of interfering with the normal measurement on the surface of the optical element 40 in this specification, which may also include the crack on the surface of the optical element 40 caused by damage to the optical element 40 as the foreign matter f stained on the optical element 40.

FIG. 3A is a view schematically showing a situation in which the foreign matter f is stained on the optical element in the intraoral scanner 1 according to the present disclosure, FIG. 3B is a view showing when capturing is performed in a state in which the foreign matter f is stained on the optical element 40 in the intraoral scanner 1 according to the present disclosure, and FIG. 3C is a view showing only the shape of the foreign matter in the state in which the foreign matter is stained on the optical element in the intraoral scanner according to the present disclosure.

Referring to FIG. 3A, the foreign matter f is stained to the surface of the optical element 40. Due to the nature of the use of the intraoral scanner 1, the foreign matter f may be stained anywhere on the surface of the optical element 40, and light incident on the area where the foreign matter f is stained is not received by the imaging unit 20 through a normal path. Referring to FIGS. 3B and 3C, light is not received by the imaging unit 20 with respect to the area where the foreign matter f of the optical element 40 is stained, and the measurement result for the area corresponding to the portion where light is not received is not expressed as image data. Accordingly, according to the present disclosure, the intraoral scanner 1 self-investigates the periodic state of the optical element 40 so that the user may replace the optical element 40 or the tip case 14 in which the optical element 40 is disposed.

Describing in detail the point where the measurement result is not expressed as the image data for the area corresponding to the portion where light is not received, a pattern may be formed on the object by light, and in addition, the pattern is not formed at a specific position of the object when the foreign matter is stained on the optical element 40. When the pattern is not formed at the specific position of the object, the image data may not be expressed on the portion corresponding to the position where the foreign matter is stained even when light is later incident from the imaging unit 20 formed inside the intraoral scanner 1. At this time, light may be formed in the form of reflection and pattern by a digital micromirror device (DMD). Meanwhile, the pattern may have the form of structured light. The image data acquired in an image recognizing operation may include a predetermined pattern by irradiating light having the shape of the pattern.

Figure 4:
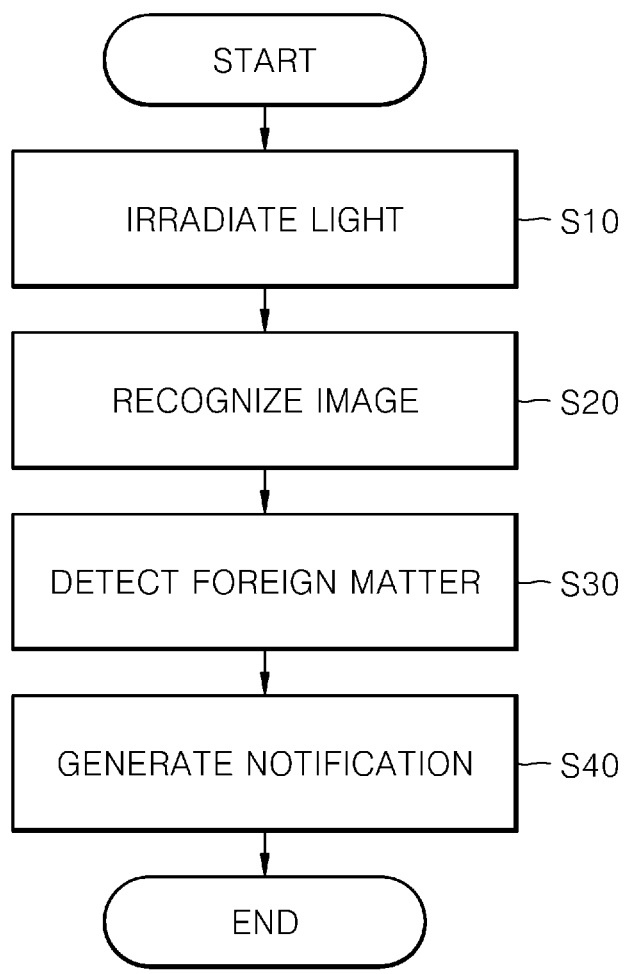
FIG. 4 is a flowchart of the method for investigating the optical element embedded in the intraoral scanner according to the present disclosure.

FIG. 4 is a flowchart of the method for investigating the optical element embedded in the intraoral scanner according to the present disclosure.

Referring to FIG. 4, the method for investigating the optical element according to the present disclosure includes a light irradiating operation (S10) of irradiating light from the intraoral scanner 1 in order to irradiate the state inside the oral cavity, and an image recognizing operation (S20) of illuminating an object (including inside the patient's oral cavity, that is, teeth, gums, or the like of the patient due to the nature of the use of the intraoral scanner 1) by light irradiated from the light irradiating operation (S10), and receiving light reflected from the object through the intraoral scanner 1 to recognize light as image data. As described above, when the scan starts by turning on the intraoral scanner 1, the light irradiation unit 30 illuminates the object by generating light (S10), and light is reflected from the surface of the illuminated object and incident on the optical element 40 formed inside the tip case 14 having the opening formed on one end. The optical element 40 refracts and reflects the incident light to be incident on at least one of the cameras 21 and 22, and light incident on the cameras 21 and 22 is recognized as image data by the imaging sensor 30 connected to the cameras 21 and 22 (S20).

Meanwhile, as the user continuously performs the scan, the position of the object to be captured is continuously changed. At this time, the form of the object to be captured is deformed, and data is continuously measured in the image recognizing operation, but light reflected from the object is not normally refracted and reflected by the optical element 40 with respect to the area where the foreign matter f is stained, so that noise unnecessary for the measurement result is generated or the data is not measured. In other words, due to the characteristics of the intraoral scanner 1, a focus range is set up to a certain distance from the opening, and thus the intraoral scanner 1 is input in the form that is out of focus with respect to the area where the foreign matter f is stained due to the foreign matter f positioned at the place that is out of the focus range, and as a result, the data of the corresponding area is processed as noise or the data is not measured in the three-dimensional processing process.

Figure 5:
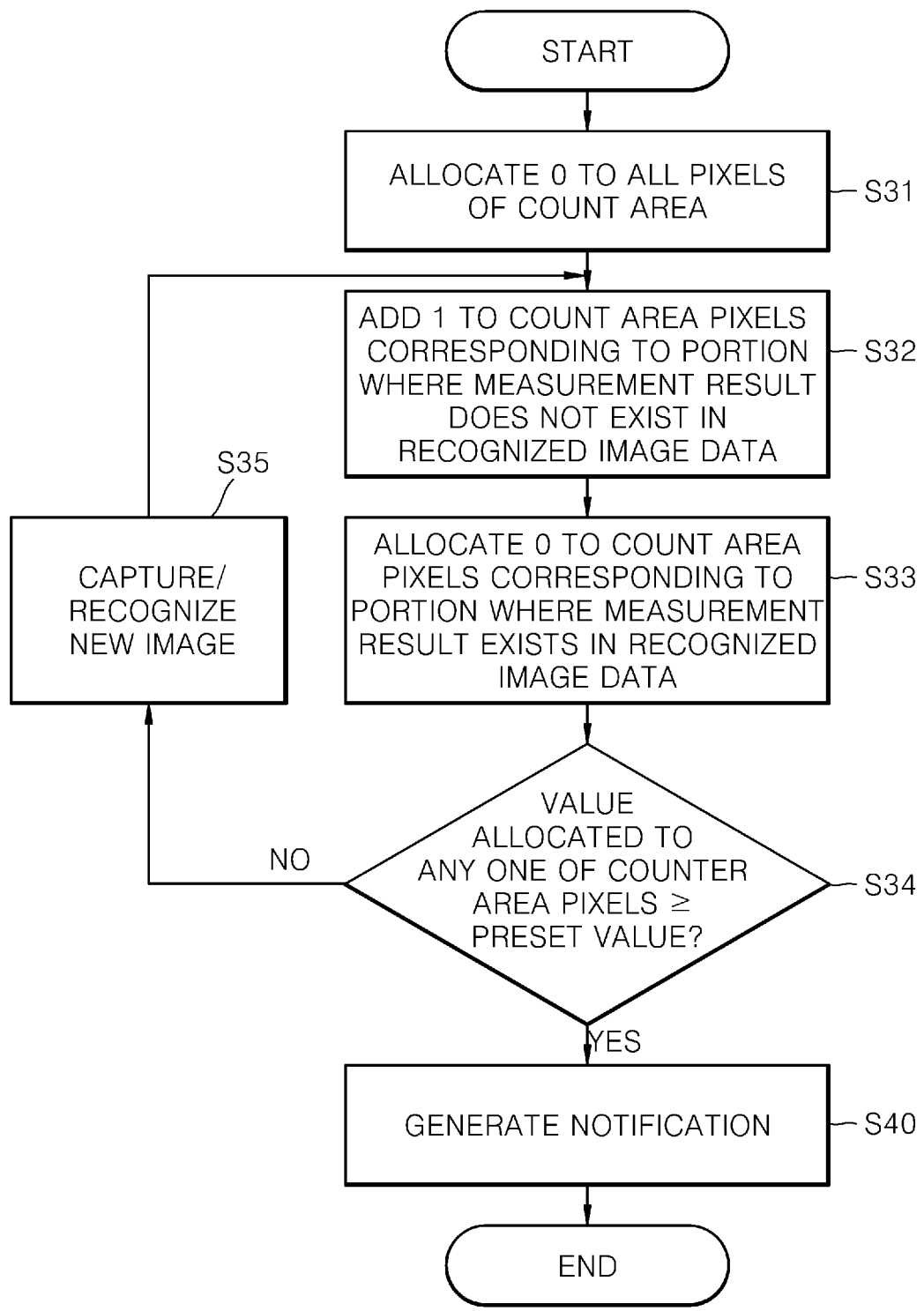
FIG. 5 is a flowchart showing a foreign matter detecting operation in more detail in the method for investigating the optical element embedded in the intraoral scanner according to the present disclosure.
Figure 6:
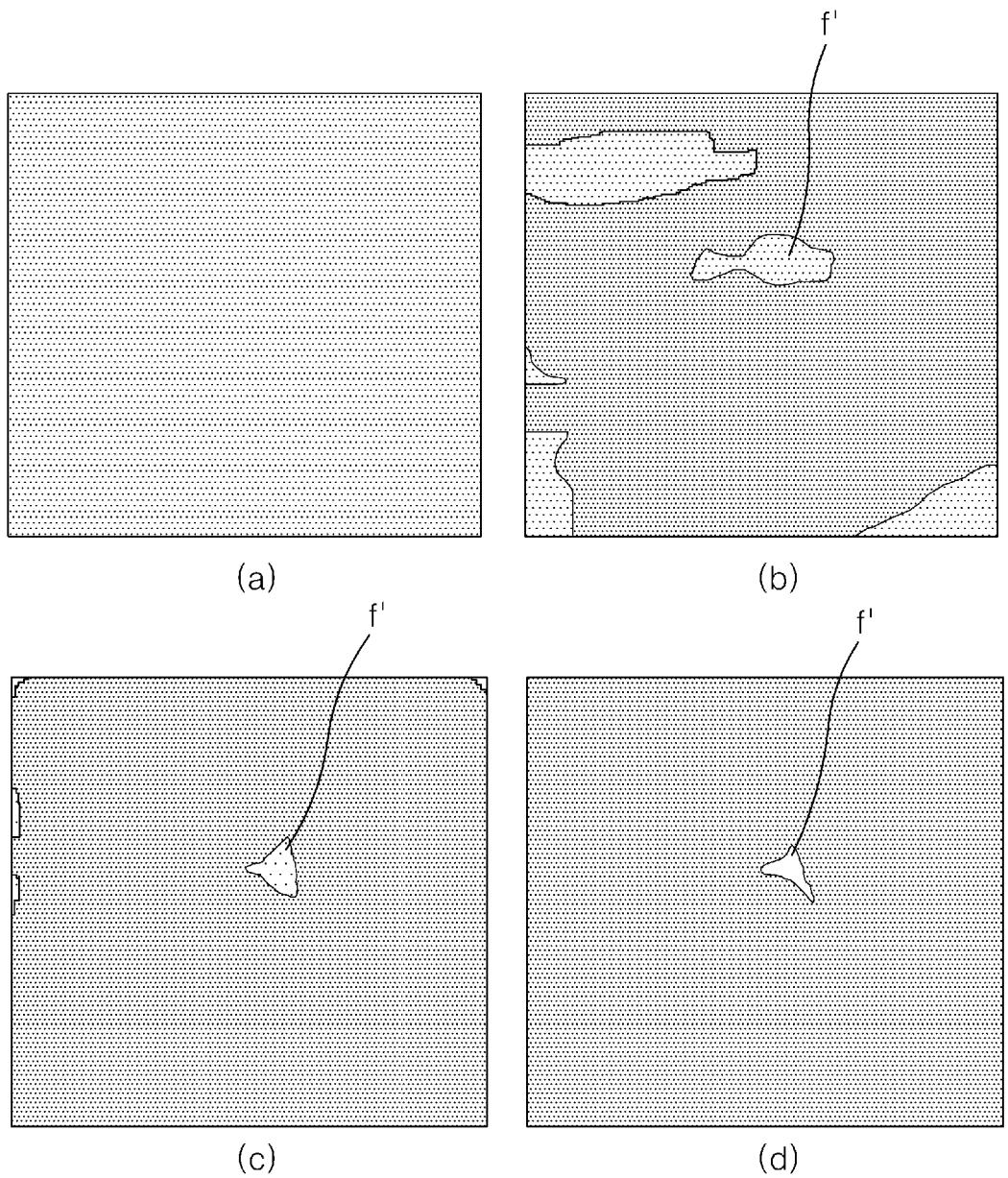
FIG. 6 is a view for describing a count area.

FIG. 5 is a flowchart showing the foreign detecting operation (S30) in more detail in the method for investigating the optical element embedded in the intraoral scanner 1 according to the present disclosure, and FIG. 6 is a view for describing a count area.

Hereinafter, the foreign matter detecting operation (S30) in the method for investigating the optical element according to the present disclosure will be described in detail. The optical element investigation unit 200 electrically connected to the intraoral scanner 1 performs the foreign matter detecting operation (S30) of confirming whether the foreign matter f is stained on the optical element 40 based on the image data acquired by the intraoral scanner 1.

First, the image data captured by the cameras 21 and 22 and generated by the imaging sensor 30 is displayed in real time on a display device connected to the intraoral scanner 1. This is to enable the patient's affected object to be stably scanned by displaying the portion illuminated by the user of the intraoral scanner 1 in real time. Meanwhile, a count area having the size corresponding to the image generated by the imaging sensor 30 (which is digitized with respect to the captured area) is generated and displayed on the display unit 210 of the optical element investigation unit 200 on a screen of the display device. At this time, the count area is not an area where images captured by the cameras 21 and 22 are directly displayed, but is a virtual area for determining whether the measurement result data exists. In addition, the count area is composed of pixels, and each pixel may be formed to have the size corresponding to the image data generated by capturing the object. For example, the count area may also be formed to have the same size as the image data generated by the imaging sensor 30. In addition, for example, the count area may be formed to have the one-to-one correspondence with the image data. When the pixels of the count area have the one-to-one correspondence with the pixels of the image, the method for investigating the optical element according to the present disclosure may intuitively perform the optical element investigation.

When the count area is initially generated, initial values are allocated to all pixels to initialize pixel values configuring the count area (base operation (S31)). Pixels in which the initial values are allocated to the pixel values are expressed in black on the display device when viewed with naked eye. At this time, the pixel value may have a range from 0 to 255, and when the pixel value is 0, the pixel is expressed in black, and when the pixel value is 255, the pixel is expressed in white, so that the pixel becomes brighter as the pixel value increases. In other words, the pixel value allocated to each pixel may be expressed as a change in brightness of an achromatic color in the count area according to a gray scale. At this time, an initial value may be any value from 0 to 255, but to effectively compare a portion where the measurement result exists and a portion where the measurement result does not exist, it is preferable that the initial values of the pixels allocated in the base operation are set to 0.

When the base operation (S31) is performed, the optical element investigation unit 200 adds an additional value so that the pixel values of the count area corresponding to the portion where the measurement result does not exist in the image data acquired in the above-described image recognizing operation are changed (specifying operation (S32)). Accordingly, the count area corresponding to the portion where the measurement result does not exist has a brighter color compared to the pixel where the measurement result exists. At this time, considering that the pixel value is an integer value having a value from 0 to 255, the addition value may be set to 1.

In addition, the initial values are again allocated to the pixel values of the count area corresponding to the portion where the measurement result exists in the image data acquired in the image recognizing operation (S20) (reallocating operation (S33)). It is practically difficult to detect the foreign matter f from the image data acquired by one single capturing, and even when the foreign matter f is detected by one single capturing, the reliability of the detection may not be guaranteed. Accordingly, for the portion where the measurement result does not momentarily exist by performing capturing a plurality of times, as a result, the pixel value is returned to the initial value to prevent the false detection of the foreign matter f.

Meanwhile, FIG. 5 shows that the reallocating operation (S33) is sequentially performed after the specifying operation (S32), but the present disclosure is not limited thereto. Since the image data generated by the captured area may be divided into the portion where the measurement result exists and the portion where the measurement result does not exist, it goes without saying that the specifying operation (S32) after the reallocating operation (S33) may also be performed, and the specifying operation (S32) and the reallocating operation (S33) may also be performed in parallel, as necessary.

After the above-described specifying operation (S32) and reallocating operation (S33) are performed, a determining operation (S34) of determining whether the foreign matter f exists in the optical element 40 of the intraoral scanner 1 is performed. For example, the determining operation (S34) may be performed by the determination unit 220 of the optical element investigation unit 200. In the determining operation, when the pixel values allocated to the pixels configuring the count area are less than a predesignated first set value, the optical element investigation unit 200 determines that the foreign matter f is not found or foreign matter image f' is not specified enough to determine that the foreign matter f exists, and captures and recognizes a new image (re-recognizing operation (S35)). At this time, the first set value is a preset value, and may be set to a value determined to be clear enough to distinguish the foreign matter image f' displayed on the count area from surrounding areas. From the new image data, the specifying operation (S32) of adding 1 to a count area pixel value corresponding to the portion where the measurement result does not exist again, and the reallocating operation (S33) of allocating 0 to the count area pixel value corresponding to the portion where the measurement result exists are performed again.

As described above, by repeatedly performing the specifying operation (S32) and the reallocating operation (S33) by the optical element investigation unit 200, the area corresponding to the portion where the measurement result does not exist on the count area gradually becomes brighter due to the increase in the pixel value. For example, (a) to (d) of FIG. 6 show the count areas when 1 second ((a) of FIG. 6), 10 seconds ((b) of FIG. 6), 30 seconds ((c) of FIG. 6), and 60 seconds ((d) of FIG. 6) have elapsed since the foreign matter f was detected, respectively. Referring to (a) to (d) of FIG. 6, the triangular-shaped foreign matter image f' in the central portion of each drawing gradually becomes brighter as the foreign matter f detecting operation is repeated over time. Accordingly, it is possible to confirm whether the foreign matter f exists as the specifying operation (S32) and the reallocating operation (S33) are performed again, and improve the reliability of the investigating method. Meanwhile, the elapsed times (1 second, 10 seconds, 30 seconds, and 60 seconds) are illustrative, and may mean that the count area varies according to a first elapsed time, a second elapsed time, a third elapsed time, and a fourth elapsed time. In other words, it should be understood that the drawing is to describe that the foreign matter detecting operation (S30) is performed and the foreign matter image f' appears clearly over time.

The method for investigating the optical element according to the present disclosure will be described in more detail with reference to FIG. 6. Referring to (a) of FIG. 6, no particular change is detected in the count area when the first elapsed time has elapsed. Accordingly, the count area is darkened as a whole.

Referring to (b) of FIG. 6, at least a part of the count area when the second elapsed time has elapsed is expressed brighter than in (a) of FIG. 6. In this process, there is no foreign matter f attached to the optical element, but a noise data area or the area where the measurement result does not exist may instantaneously occur. With respect to the area, a predetermined pixel value may be added to the count area corresponding to the image data received in the specifying operation (S32).

Referring to (c) of FIG. 6, at least a part of the count area when the third elapsed time has elapsed is expressed brighter than in (b) of FIG. 6. Meanwhile, the noise data area or the area where the measurement result does not exist generated instantaneously is darkened again because the initial pixel value is allocated to the corresponding count area by the repeatedly performed specifying operation (S32) and reallocating operation (S33).

Referring to (d) of FIG. 6, at least a part of the count area when the fourth elapsed time has elapsed is expressed brighter than in (c) of FIG. 6. At this time, the fourth elapsed time may refer to a time for which the foreign matter image f' may be clearly distinguished and expressed compared to other areas. Through the clearly displayed foreign matter image f', the user may easily confirm whether the foreign matter has been attached to the optical element.

In addition, by repeatedly performing the specifying operation (S32) and the reallocating operation (S33), the initial value is reallocated in the reallocating operation (S33) when data is input by the normal measurement again later even when the pixel value may be added by the specifying operation (S32) because data is not temporarily input due to other reasons irrelevant to the attachment of the foreign matter. Accordingly, it is possible to prevent the false detection of the foreign matter due to a temporary data input error and improve the reliability of the method for investigating the optical element.

Meanwhile, the specifying operation (S32) may be performed at an interval of 1 second or less. In other words, a time interval until the specifying operation is performed again through the re-recognizing operation after the specifying operation may be 1 second or less. When the time interval is longer, the total time required for detecting the foreign matter f gets longer, making it difficult to quickly detect the foreign matter f. Accordingly, it is preferable that a time between a certain specifying operation and the next specifying is one second or less.

In addition, when the values allocated to the pixels configuring the count area are greater than or equal to the first set value, an operation of generating a notification on the display device (S40) is performed. Generating the notification on the display device may be outputting a message requesting the inspection of the optical element 40 according to the detection of the foreign matter f or damage to the optical element 40 in a new pop-up window, or outputting a message to replace the tip case 14 formed therein from the optical element 40. In addition, generating the notification on the display device may be not only outputting the message on the display device but also generating a notification sound. When seeing the message output on the display device or hearing the notification sound, the user may inspect the state of the optical element 40 of the intraoral scanner 1 in use or replace the tip case 14 in which the optical element 40 is disposed, and the user may perform the scan operation without directly inspecting the state of the optical element 40 from time to time, so that it is possible not only to improve the user's operation efficiency, but also improve the scan reliability of the intraoral scanner 1.

Meanwhile, the foreign matter f stained on a small area does not cause a big problem in measurement, and may be a material that may be separated while the intraoral scanner 1 is used as dust of a very small size. Accordingly, in this case, when the area where the measurement result does not exist is greater than or equal to an area of a specific size, it may be determined that the foreign matter f is stained on the optical element 40.

After the specifying operation (S32) or the reallocating operation (S33), the method for investigating the optical element according to the present disclosure may perform the specifying operation and the reallocating operation again by capturing and recognizing a new image when the count area pixel value is less than the first set value or when the number of pixels in which the count area pixel value is greater than or equal to the first set value is counted and the number of pixels counted is less than the second set value, and perform the notification generating operation (S40) when the number of pixels in which the count area pixel value is greater than or equal to the first set value is counted and the number of pixels counted is greater than or equal to the second set value. The first set value is the same as described above, and the second set value is a preset value for the number of pixels satisfying the condition in which the pixel value is greater than or equal to the first set value. The second set value is a reference value for an area of a pixel having a brightness greater than or equal to a specific brightness, and when the number of pixels counted is greater than or equal to the second set value, this is determined as the foreign matter f. Accordingly, in this case, the notification generating operation (S40) is performed only when the two set value criteria are all satisfied, so that it is possible to improve the accuracy of detecting the presence or absence of the foreign matter f.

Hereinafter, a system for investigating the optical element according to the present disclosure will be described. In describing the system for investigating the optical element, the above-described portions of the method for investigating the optical element will be briefly described or omitted.

Figure 7:
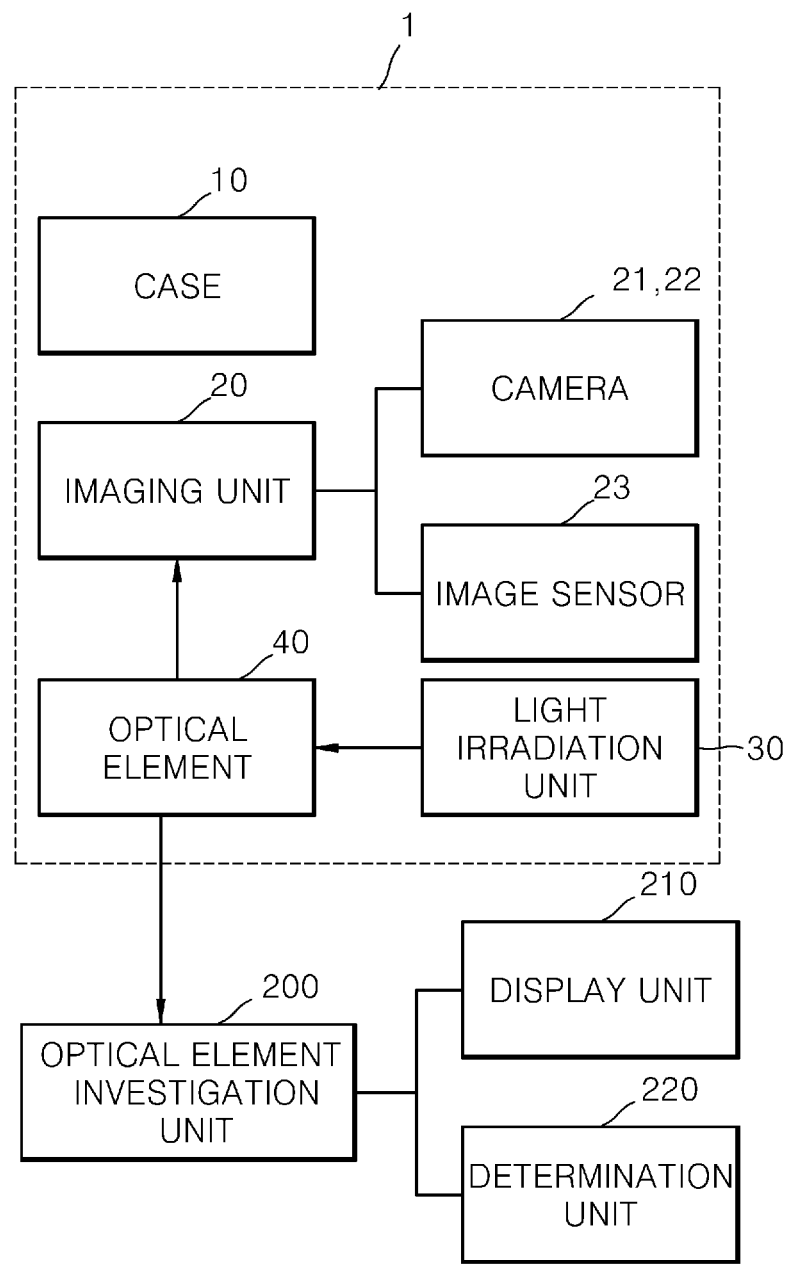
FIG. 7 is a schematic view of a system for investigating the optical element according to the present disclosure.

FIG. 7 is a schematic view of a system for investigating the optical element according to the present disclosure.

Referring to FIG. 7, the system for investigating the optical element according to the present disclosure may include the intraoral scanner 1. At this time, the intraoral scanner 1 may include the case 10 that may be drawn into and drawn out from the oral cavity, and is formed with an opening that is open so that the state inside the oral cavity is incident therein in the form of light through one end, at least one imaging unit 20 configured to generate image data by receiving light incident through the opening of the case 10, the light irradiation unit 30 disposed at one side of the imaging unit, and configured to emit light to irradiate the state inside the oral cavity through the opening, and the optical element configured to illuminate the object by refracting or reflecting light generated from the light irradiation unit 30, and cause light reflected from the object to enter into the imaging unit 20. Meanwhile, an operating principle of the intraoral scanner 1 is the same as described above in the method for investigating the optical element using the intraoral scanner 1.

Light incident on the imaging unit 20 is generated as image data by the imaging sensor 32, and whether the foreign matter is stained on the optical element is determined and the generated image data is displayed by an optical element investigation unit 200. At this time, the optical element investigation unit 200 may include a display unit 210 configured to display the count area with the size corresponding to the image generated by the imaging unit 20, and a determination unit 220 configured to determine whether the foreign matter is stained by the operation of the count area. Meanwhile, the optical element investigation unit 200 may also be formed to be spaced apart from the intraoral scanner 1, but the present disclosure is not necessarily limited thereto, and may be formed inside the intraoral scanner 1, so that the intraoral scanner 1 may also self-investigate whether there is a problem in the state of the optical element However, in this case, it is preferable that the display unit 210 on which the count area is displayed is formed to be spaced apart from the intraoral scanner 1.

Describing an operation of the optical element investigation unit 200, first, the count area is generated on the display unit 210, and a pixel value of 0 is allocated to all pixels configuring the count area. At this time, the count area may have the size corresponding to the size of the image acquired by the imaging unit 20. Preferably, the count area has the same size as that of the image acquired by the imaging unit 20, so that the pixels configuring the image data acquired by the imaging unit 20 have the one-to-one correspondence with the pixels configuring the count area, respectively.

Meanwhile, when the initial values of the pixel values are allocated to all pixels configuring the count area and initialization is completed, an additional value is added to the pixel values of the count area corresponding to the portion where the measurement result does not exist from the image data generated by the imaging unit. The pixel value may be an integer value between 0 and 255, and as the pixel value increases from 0 to 255, the pixel may be displayed on the display unit 210 to gradually brighten from black to white. In addition, when the imaging unit 20 generates image data in order to continuously investigate the state of the optical element, the portion where the foreign matter is stained continuously appears as the portion where the measurement result does not exist, whereas the measurement result does not momentarily exist in other portions, and portions where the measurement result is received again appear. Accordingly, the initial values are again reallocated to the pixel values of the count area corresponding to the portion where the measurement result exists. The optical element investigation unit 200 adds the additional value to the pixel values of the count area corresponding to the portions in which the measurement result does not exist, and the initial values are reallocated to the pixel values of the count area corresponding to the portions in which the measurement result is received, so that it is possible to perform a clear foreign matter detection. Meanwhile, the initial value and the additional value may preferably be 0 and 1, respectively, as described above.

In addition, when the pixel values of the count area are greater than or equal to the first preset value, the determination unit 220 may determine that the foreign matter is attached to the optical element to control the notification unit to generate the notification. At this time, the determination unit 220 may be a processor configured to apply the control signal to each unit configuring the system, or determine whether the foreign matter is detected with respect to the pixel values of the count area displayed on the display unit 210, and the notification unit may be at least one among the display unit 210 electrically connected to the determination unit 220, the light irradiation unit 30 and/or a vibration means (not shown) embedded in the intraoral scanner 1, and a speaker (not shown) formed to be spaced apart from the intraoral scanner 1.

Meanwhile, the determination unit 220 may count the number of pixels in which the count area pixel value is the first set value, and control the notification unit to generate the notification when the number of pixels counted is greater than or equal to the second set value. When the foreign matter of less than a certain size is stained to the optical element, it may not significantly affect the scanning inside the oral cavity. Accordingly, when it is determined that the pixels in which the count area pixel value is greater than or equal to the first set value are generated in a certain area or more, the determination unit 220 determines that the foreign matter of the size that will actually interfere with measurement has been stained on the optical element so that the notification unit generates the notification signal. At this time, the notification signal may be expressed in various methods, such as a vibration signal, a sound signal, and a light emission signal, generated by the intraoral scanner. Alternatively, in goes without saying that the count area may be displayed in the form of a pop-up on the display unit 210 to notify the user of the inspection and replacement of the optical element.

The above description is merely illustrative of the technical spirit of the present disclosure, and various modifications and changes will be possible by those skilled in the art to which the present disclosure pertains without departing from the essential characteristics of the present disclosure.

Accordingly, the embodiments disclosed in the present disclosure is not intended to limit the technical spirit of the present disclosure but is intended to describe it, and the scope of the technical spirit of the present disclosure is not limited by these embodiments. The scope of the present disclosure should be construed by the appended claims, and all technical spirits within the scope equivalent thereto should be construed as being included in the scope of the present disclosure.

INDUSTRIAL APPLICABILITY

The present disclosure relates to the method and system for investigating the optical element embedded in the intraoral scanner, and it is possible to easily maintain the intraoral scanner by enabling the user to recognize it when it is determined that the foreign matter is attached to the optical element. Accordingly, it is possible to improve the scan efficiency of the intraoral scanner.

The invention claimed is:

1. A method for investigating an optical element embedded in an intraoral scanner, the method comprising:
　an image recognizing operation of acquiring a plurality of image data by receiving light reflected from an object in a measurement area of the intraoral scanner by the intraoral scanner;
　a foreign matter detecting operation of checking whether foreign matter is stained on a surface of the optical element which illustrates the object by refracting or reflecting light generated from a light irradiation unit, and causes light reflected from the object to enter at least one imaging unit, from the plurality of image data by a processor; and
　a notification generating operation of generating a feedback when it is determined that the foreign matter exists on the surface of the optical element as the foreign matter detecting operation is performed by the processor,
　wherein the foreign matter detecting operation checks whether the foreign matter is stained on the surface of the optical element based on a data which is processed as noise or not measured in three-dimensional processing processed through accumulation of the plurality of image data,
　wherein the foreign matter detecting operation includes a specifying operation of changing values of at least some pixels of the count area corresponding to a portion where an input result in the image data does not exist depending on whether the image data is input, and
　a reallocating operation of initializing the values of at least some pixels of the count area corresponding to a portion where the input result exists depending on whether the image data is input,
　wherein in the reallocating operation, with respect to an area where the measurement result does not exist temporarily, an initial pixel value is reallocated to the corresponding count area.

2. The method of claim 1,
　wherein the foreign matter detecting operation includes a base operation of generating the count area corresponding to the measurement area.

3. The method of claim 2,
　wherein a size of the count area is formed in a same size as that of the measurement area, and pixels of the measurement area have a one-to-one correspondence with pixels of the count area.

4. The method of claim 1,
　wherein the count area is initialized before the specifying operation, and the specifying operation adds values of the at least some pixels of the count area.

5. The method of claim 4,
　wherein the specifying operation or the reallocating operation are repeatedly performed for each image data acquired by the image recognizing operation.

6. The method of claim 5,
　wherein the notification generating operation is performed when the values of the at least some pixels of the count area that have been changed by the specifying operation are greater than or equal to a first set value.

7. The method of claim 5,
including a determination operation of performing the notification generating operation by the processor when a number of pixels in which the values of the at least some pixels of the count area that have been changed by the specifying operation are greater than or equal to a first set value is counted and the number of pixels counted is greater than or equal to a second set value.

8. The method of claim 4,
wherein at least one value among the values added by the specifying operation is 1.

9. The method of claim 1,
wherein the notification generating operation outputs a notification message that requests an inspection of the optical element on a display device connected to the intraoral scanner or generates a notification sound.

10. The method of claim 1, further including a light irradiation operation of irradiating light of a specific pattern to the object by the intraoral scanner, wherein the plurality of image data acquired in the image recognizing operation includes a predetermined pattern.

11. An investigating system, comprising:
a case drawn into and drawn out from an oral cavity, and formed with an opening that is open so that a state inside the oral cavity is incident therein in the form of light through one end;
at least one imaging unit disposed inside the case, and configured to receive light incident through the opening of the case to acquire a plurality of image data by an embedded imaging sensor;
a light irradiation unit disposed at one side of the imaging unit, and configured to emit light to irradiate the state inside the oral cavity through the opening;
an optical element configured to illuminate an object by refracting or reflecting the light generated from the light irradiation unit, and cause the light reflected from the object to enter into the at least one imaging unit;
a processor configured to determine whether foreign matter exists on a surface of the optical element; and
a notification unit configured to generate a feedback depending on the determination of the processor,
wherein the processor is configured to check whether the foreign matter is stained on the surface of the optical element based on a data which is processed as noise or not measured in three-dimensional processing processed through accumulation of the plurality of image data,
wherein the processor is configured to change values of at least some pixels of a count area corresponding to a portion where an input result in the image data does not exist depending on whether the plurality of image data acquired by the imaging sensor is input,
wherein the processor is configured to initialize values of at least some pixels of the count area corresponding to a portion where the input result exists depending on whether the image data is input,
wherein the processor is configured to reallocate an initial pixel value to the corresponding count area with respect to an area where the measurement result does not exist temporarily.

12. The system for investigating the optical element of claim 11,
wherein the processor is further configured to determine whether the foreign matter is stained through the count area corresponding to the plurality of image data acquired by the imaging sensor.

13. The system for investigating the optical element of claim 12,
wherein the count area has pixels having a one-to-one correspondence with the image data acquired by the imaging sensor, and the determination unit determines whether the foreign matter is stained through pixel values of the count area that vary depending on whether the image data is input.

14. The system for investigating the optical element of claim 13,
wherein the determination unit adds values of at least some pixels of the count area corresponding to a portion where an input result does not exist depending on whether the image data is input.

15. The system for investigating the optical element of claim 14,
wherein the determination unit initializes the pixel value before adding the pixel value.

16. The system for investigating the optical element of claim 14,
wherein the determination unit initializes values of at least some pixels of the count area corresponding to a portion where the input result exists depending on whether the image data is input.

17. The system for investigating the optical element of claim 16,
wherein the determination unit generates a feedback when the values of the at least some pixels of the count area that have been changed by the processor are greater than or equal to a first set value.

18. The system for investigating the optical element of claim 16,
wherein the determination unit generates a feedback when the number of pixels in which the values of the at least some pixels of the count area that have been changed by the processor are greater than or equal to a first set value is counted and the number of pixels counted is greater than or equal to a second set value.

19. The system for investigating the optical element of claim 13,
wherein the determination unit adds values of at least some pixels of the count area corresponding to a portion where an input result of the image data does not exist or initializes values of at least some pixels of the count area corresponding to a portion where the input result of the image data exists depending on the image acquired by the imaging sensor.

* * * * *